United States Patent
Kawase et al.

(10) Patent No.: US 11,393,611 B2
(45) Date of Patent: Jul. 19, 2022

(54) WIRE HARNESS PRODUCTION SUPPORTING DEVICE AND WIRE HARNESS PRODUCTION SUPPORTING METHOD

(71) Applicant: Hitachi Metals, Ltd., Tokyo (JP)

(72) Inventors: Kenji Kawase, Tokyo (JP); Katsuju Aoki, Tokyo (JP); Raifu Yamamoto, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 34 days.

(21) Appl. No.: 16/803,784

(22) Filed: Feb. 27, 2020

(65) Prior Publication Data

US 2020/0286651 A1   Sep. 10, 2020

(30) Foreign Application Priority Data

Mar. 5, 2019 (JP) .............................. JP2019-039554

(51) Int. Cl.
*H01B 13/012* (2006.01)
*G07C 1/10* (2006.01)

(52) U.S. Cl.
CPC ......... *H01B 13/01209* (2013.01); *G07C 1/10* (2013.01); *H01B 13/01236* (2013.01)

(58) Field of Classification Search
CPC ........................... H01B 13/01209; G07C 1/10
See application file for complete search history.

(56) References Cited

U.S. PATENT DOCUMENTS

| 2016/0064121 | A1 | 3/2016 | Rougier et al. |
| 2016/0225492 | A1* | 8/2016 | Toyama .................. G06F 30/15 |

FOREIGN PATENT DOCUMENTS

| EP | 3 065 146 A1 | 9/2016 | |
| JP | 07220542 A | * 8/1995 | ......... B60R 16/0207 |
| JP | 2008-099407 A | 4/2008 | |
| JP | 2008186360 A | * 8/2008 | |
| JP | 2016-213160 A | 12/2016 | |
| JP | 2016213160 A | * 12/2016 | |

OTHER PUBLICATIONS

Extended European Search Report dated Jun. 24, 2020, for European Patent Application No. 20160230.7-1205.
Communication Pursuant to Article 94(3) EPC dated Dec. 15, 2021, in corresponding European Patent Application No. 20 160 230.7-1205.
Japanese Office Action dated May 24, 2022, in Japanese Patent Application No. 2019-039554, with an English translation thereof.

* cited by examiner

*Primary Examiner* — Peter Dungba Vo
*Assistant Examiner* — Jose K Abraham
(74) *Attorney, Agent, or Firm* — McGinn I.P. Law Group, PLLC.

(57) ABSTRACT

A wire harness production supporting device configured to produce a wire harness by in turn laying out a plurality of electric wires on a wire laying out drawing. This wire harness production supporting device is composed of a time recording section configured to, each time one of the plurality of electric wires is laid out, store a time at which the one of the plurality of electric wires has been laid out, in a storing section, and a progress status administrating section configured to obtain a progress status of the production of the wire harness based on the time at which the one of the plurality of electric wires has been laid out having been stored in the storing section.

10 Claims, 9 Drawing Sheets

172 OPERATION RECIPE INFORMATION

| | From | | | | | To | | | | | length | Cable Part No. |
|---|---|---|---|---|---|---|---|---|---|---|---|---|
| | Area label | Side | X | Y | Ring mark | Ring mark | X | Y | Side | Area label | | |
| 1 | Heater A | A | 100 | 320 | 1 824A | 1 824A | 5100 | 320 | C | Heater C | 5000 | ***** |
| 2 | Heater A | A | 100 | 320 | 2 825A | 2 825A | 5100 | 320 | C | Heater C | 5000 | ***** |
| 3 | Heater B | A | 1300 | 850 | 3 800RA | 3 800RA | 5100 | 320 | C | Heater C | 4000 | ***** |
| ⋮ | ⋮ | ⋮ | ⋮ | ⋮ | ⋮ | ⋮ | ⋮ | ⋮ | ⋮ | ⋮ | ⋮ | ⋮ |

WIRE HARNESS PRODUCTION SUPPORTING DEVICE AND WIRE HARNESS PRODUCTION SUPPORTING METHOD

CROSS-REFERENCE TO RELATED APPLICATION

The present application is based on Japanese patent application No. 2019-039544 filed on Mar. 5, 2019, the entire contents of which are incorporated herein by reference.

BACKGROUND OF THE INVENTION

1. Field of the Invention

The present invention relates to a wire harness production supporting device and a wire harness production supporting method.

2. Description of the Related Art

A wire harness configured to be used in a train vehicle such as a train or the like is configured with a plurality of electric wires being bundled together therein. In producing the wire harness, the wire harness is assembled by cutting each of the plurality of electric wires to a preset electric wire length, laying them out along a full scale wire laying out drawing, and fitting the laid out electric wires or the bundle of the laid out electric wires with a component to be attached at a predetermined position thereon (see e.g. US Patent Application Publication No. 2016/0064121 A1).

[Patent Document 1] US Patent Application Publication No. 2016/0064121 A1

SUMMARY OF THE INVENTION

In producing the wire harness, performing a proper administration so as not to cause any incorrect operation is desired. In addition, in a wire harness production supporting device, in order to perform the optimization or efficiency improvement of the production process, grasping the progress status of the operation and administrating the time taken to perform the laying out of the plurality of electric wires and the like is desired.

Accordingly, it is an object of the present invention to provide a wire harness production supporting device and a wire harness production supporting method, which are configured to be able to easily grasp the progress status of operation.

For the purpose of solving the above-described problem, the present invention provides a wire harness production supporting device, which is configured to produce a wire harness by in turn laying out a plurality of electric wires on a wire laying out drawing, comprising: a time recording section configured to, each time one of the plurality of electric wires is laid out, store a time at which the one of the plurality of electric wires has been laid out, in a storing section; and a progress status administrating section configured to obtain a progress status of the production of the wire harness based on the time at which the one of the plurality of electric wires has been laid out having been stored in the storing section.

Further, for the purpose of solving the above-described problem, the present invention provides a wire harness production supporting method, which is configured to produce a wire harness by in turn laying out a plurality of electric wires on a wire laying out drawing, comprising: each time one of the plurality of electric wires is laid out, storing a time at which the one of the plurality of electric wires has been laid out, in a storing section; and obtaining a progress status of the production of the wire harness based on the time at which the one of the plurality of electric wires has been laid out having been stored in the storing section.

Points of the Invention

According to the present invention, it is possible to provide the wire harness production supporting device and the wire harness production supporting method which are configured to be able to easily grasp the progress status of operation.

DETAILED DESCRIPTION OF THE PREFERRED EMBODIMENTS

Embodiment

An embodiment of the present invention will be described below with reference to the accompanying drawings.

Figure 1:
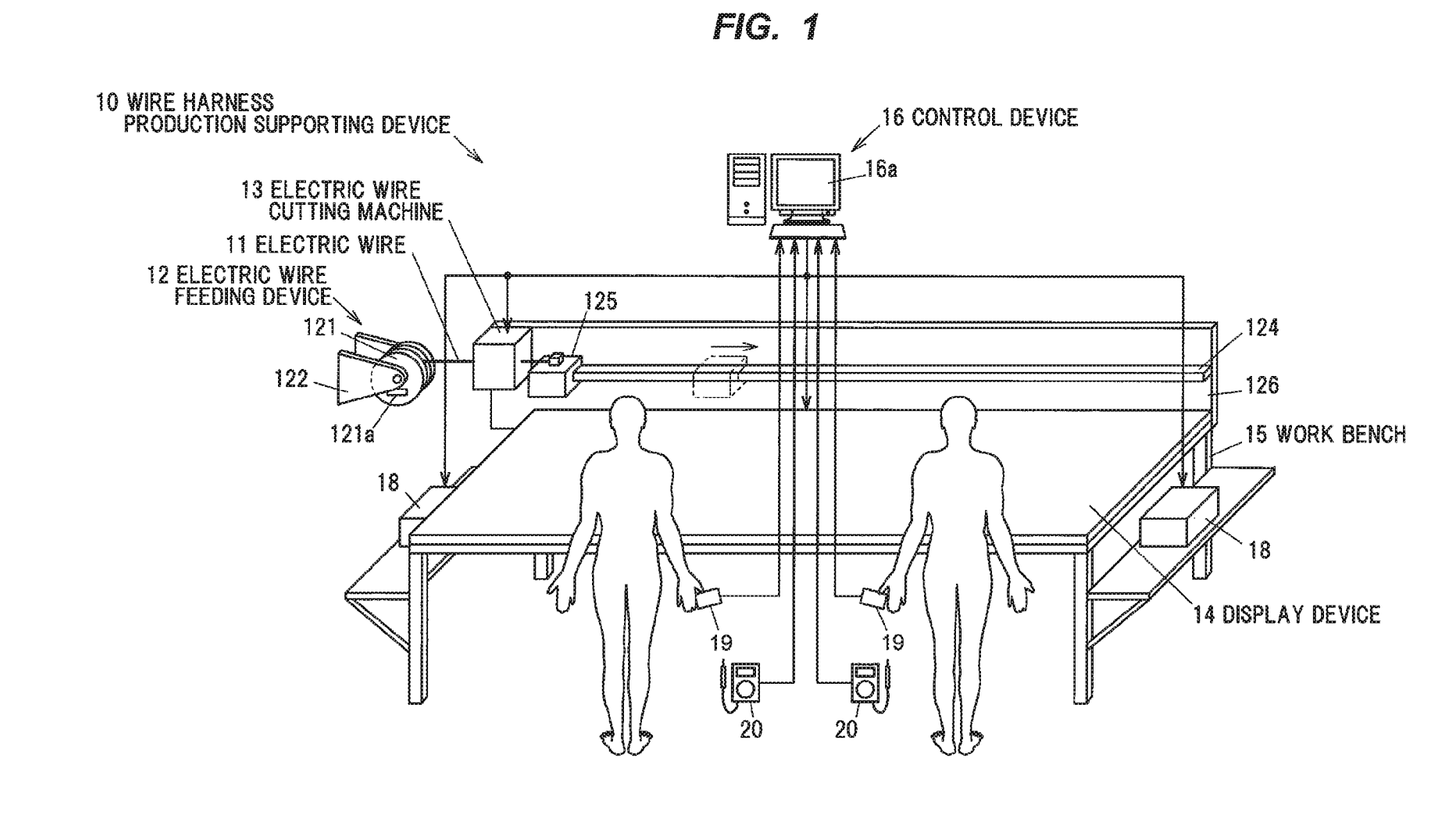
FIG. 1 is a schematic configuration diagram showing a wire harness production supporting device according to one embodiment of the present invention.
Figure 2:
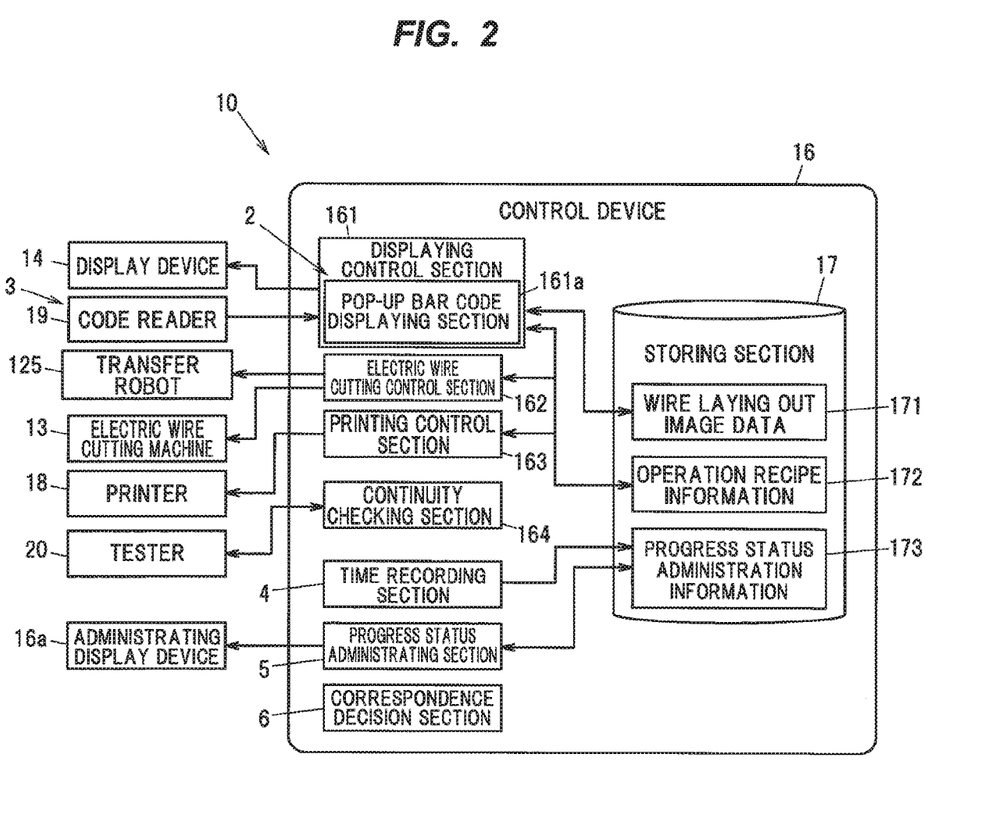
FIG. 2 is a block diagram showing inputs and outputs of a control device.

FIG. 1 is a schematic configuration diagram showing a wire harness production supporting device according to the present embodiment. A wire harness produced in the present embodiment is configured to be used, for example, in wiring between devices in a train. FIG. 2 is a block diagram showing inputs and outputs in a control device.

As shown in FIG. 1, a wire harness production supporting device 10 is a device that is configured to produce a wire harness by in turn laying out a plurality of electric wires 11 on a wire laying out drawing, and the wire harness production supporting device 10 is configured to include an electric wire feeding device 12, an electric wire cutting machine 13, which is configured to cut one electric wire 11 fed from the electric wire feeding device 12, a work bench 15 including a display device 14 configured to display a full scale wire laying out image, and a control device 16, which is configured to perform a control on the electric wire feeding device 12 and the electric wire cutting machine 13, and a displaying control on the display device 14, and the like.

The one electric wire 11 is configured as a linear shape conductor coated with an electrical insulating member around its outer periphery, but that one electric wire 11 may, as with a LAN cable, integrally be configured in such a manner that a plurality of the linear shape conductors are coated with the electrical insulating members around their outer peripheries respectively, and then covered together with an outer sheath therearound. Here, the electrical insulating members are made of an electrically insulative resin and may be configured as one layer or a plurality of layers. The outer sheath may be formed by solid extrusion in such a manner as to impregnate the spaces between the electrical insulating members, or may be formed in a tubular shape.

The electric wire feeding device 12 is configured to include a reel 121 with the above one electric wire 11 being wound therearound, a supporting member 122, which is configured to pivotably support the reel 121, and a transfer robot 125, which is configured to hold that electric wire 11 fed from the reel 121, run on a rail 124, and transfer (pull out) that electric wire 11. The reel 121 is fitted with an electric wire identification code 121a, which is configured to identify a type of the electric wire 11 being wound therearound. The rail 124 is configured to be provided above the work bench 15, and being fixed to the work bench 15 with a support plate 126 therebetween. The electric wire cutting machine 13 is configured to use a built-in cutting blade (not shown), to cut that electric wire 11 pulled out by the transfer robot 125. The type of the electric wire 11 to be cut by the electric wire cutting machine 13 can be altered by altering the reel 121 supported by the supporting member 122.

The work bench 15 is configured as a bench designed for a wire laying out operation for the electric wire 11 to be performed, and being provided with the display device 14 on its top surface, such as a liquid crystal display or the like to display a full scale wire laying out image. Note that, for example, when the wire harness required to be as long as several tens of meters is produced, a plurality of the display devices 14 may be arranged side by side on the work bench 15. In addition, in order to protect the display device 14, a protective plate made of a transparent member such as an acrylic or the like may be placed over the display device 14. A wire harness production is performed by, in turn, arranging (laying out) the electric wires 11 cut by the electric wire cutting machine 13 in such a manner as to follow the wire laying out image displayed on the display device 14, and subsequently performing tape wrapping, protective material mounting, and the like.

The control device 16 is configured to perform a control on the electric wire feeding device 12 and the electric wire cutting machine 13, and a displaying control on the display device 14, and the like, and is configured as an appropriate combination of a computing element, a memory, an interface, a hard disk, a software and the like. In the present embodiment, the control device 16 is configured to use a personal computer. The control device 16 is configured to include an administrating display device 16a, that is configured to display a progress status of operations, which will be described later.

The control device 16 is configured to include a storing section 17 that is configured to store wire laying out image data 171, operation recipe information 172, and the like. The wire laying out image data 171 is designed as image data for the wire laying out image to be displayed on the display device 14. The operation recipe information 172 is designed as a time series database with information on the electric wires 11 arranged in a wire laying out order of those electric wires 11.

Figure 3:
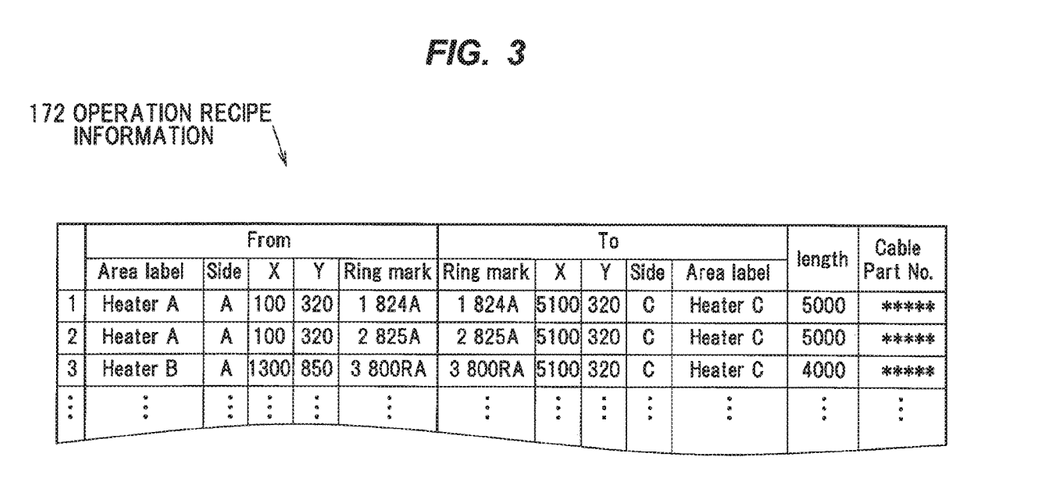
FIG. 3 is a diagram showing one example of operation recipe information.

As shown in FIG. 3, in the operation recipe information 172, for example, for each of both end portions (From and To) of each electric wire 11, a respective area label (Area label) indicating a connection destination area (e.g., a connection destination device or the like), a respective side (Side) indicating a position of each end portion, respective coordinate information (X and Y) indicating a display position of a pop-up bar code which will be described later, a respective ring mark number (Ring mark) which will be described later, and the like are configured. Further, in the operation recipe information 172, a respective design value (length) of an electric wire length of each electric wire 11 and types (Cable Part No.) of those electric wires 11 are configured. Note that the specific contents of the operation recipe information 172 are not limited to the foregoing, but can appropriately be configured.

As shown in FIG. 2, the control device 16 is configured to include a displaying control section 161, which is configured to perform a displaying control on the display device 14 of the work bench 15, an electric wire cutting control section 162, which is configured to perform a cutting control on those electric wires 11, a printing control section 163, which is configured to print, with two printers 18, identification marks to be attached to the two end portions respectively of each electric wire 11, and a continuity checking section 164 that is configured to perform a continuity checking processing on each electric wire 11. The control device 16 is configured in such a manner that the display device 14 of the work bench 15, two code readers 19, the transfer robot 125, the electric wire cutting machine 13, the two printers 18, and two continuity checking testers 20 are connected to the control device 16. Note that, in the example of FIG. 2, a plurality (two) of the continuity checking testers 20 are provided and each of those two testers 20 is being connected to a respective probe, but that one continuity checking tester 20 may be connected to a plurality of probes so as to be able to simultaneously check the continuities of the plurality of electric wires 11.

The displaying control section 161 is configured to display a full-scale wire laying out image on the display device 14, based on the wire laying out image data 171 stored in the storing section 17. In the present embodiment, the displaying control section 161 is configured to include a pop-up bar code displaying section 161a. The pop-up bar code displaying section 161a is configured to look up the operation recipe information 172, and in turn display identification codes on the display device 14 in accordance with a wire laying out order of the plurality of electric wires 11. In addition, the display of the identification code associated with the electric wire 11 having been laid out is erased by the pop-up bar code displaying section 161a. That is, the pop-up bar code displaying section 161a is configured to display only the identification information on the electric wire 11 being currently laid out.

Figure 4A:
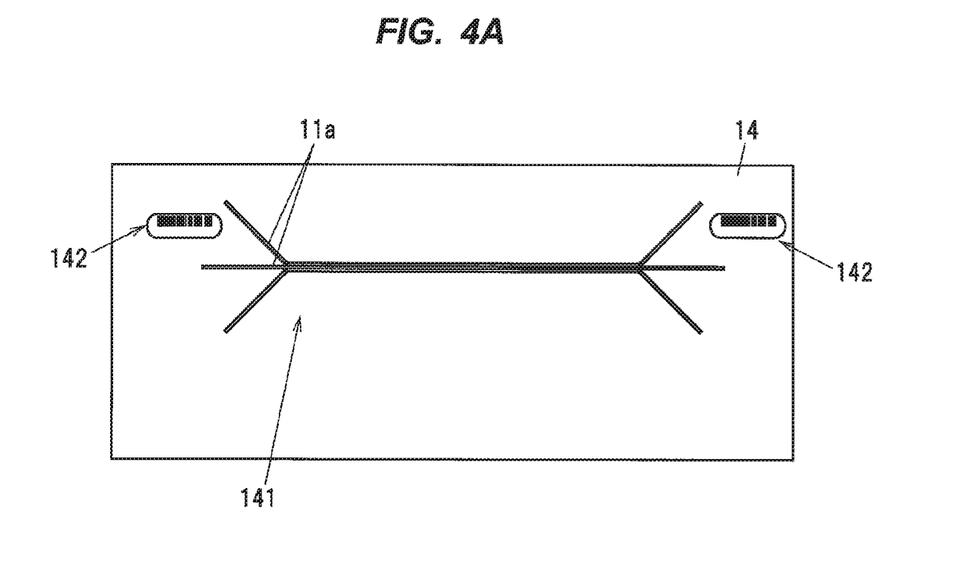
FIG. 4A is a diagram showing a display example of a wire laying out drawing and two bar codes.
Figure 4B:
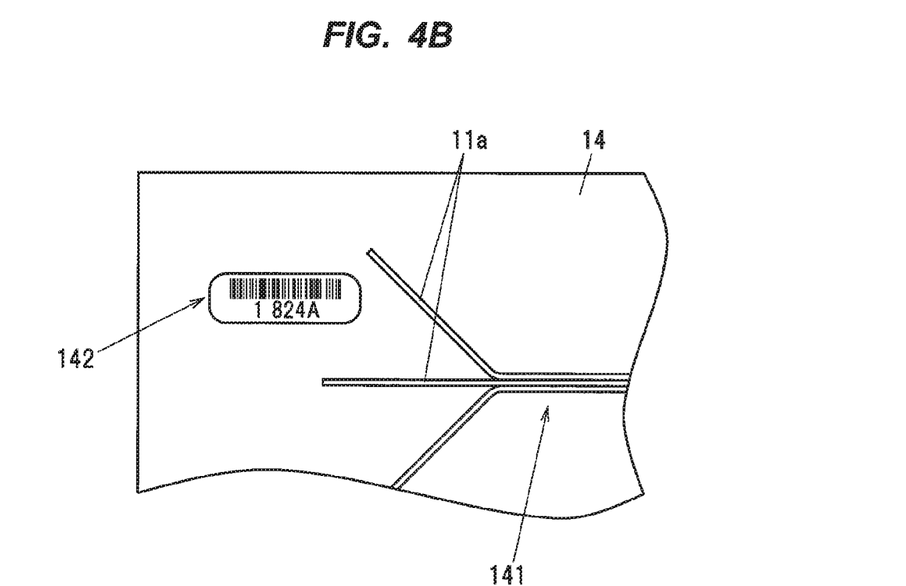
FIG. 4B is an enlarged view showing an essential portion of the display example of the wire laying out drawing and the two bar codes.

As shown in FIGS. 4A and 4B, in the present embodiment, the pop-up bar code displaying section 161a is configured to create a bar code (pop-up bar code) 142 to be able to identify the electric wire 11 to be laid out, and display that created bar code 142 in coordinates designated according to the coordinate information of the operation recipe information 172 in the display device 14. The bar code 142 is displayed in such a manner as to be superimposed on the wire laying out drawing 141 being displayed on the display device 14. The laying out drawing 141 is configured to include electric wire images 11a for a plurality (e.g., three) of the electric wires 11 having been laid out. Since each electric wire 11 has the two end portions, the present embodiment is configured to display the two bar codes 142 adjacent to the two end portions, respectively, of that electric wire 11 in the display device 14. Note that the pop-up code displaying section 161a may be configured in such a manner as to prestore the image information on the two bar codes 142 in the operation recipe information 172, and act to retrieve that image information on the two bar codes 142 and display the two bar codes 142 in the designated coordinates.

Note that the identification codes to be displayed by the pop-up bar code displaying section 161a are not limited to the bar codes 142, but may be, e.g., a two-dimensional code (QR code (registered trademark)). The pop-up bar code displaying section 161a is one aspect of a code displaying section of the present invention, and constitutes an identification code presenting means of the present invention.

The electric wire cutting control section 162 is configured to control the electric wire feeding device 12 and the electric wire cutting machine 13, to perform a cutting control to cut the electric wire 11 to a specified length. The electric wire cutting control section 162 is configured to retrieve the design value of the electric wire length of that electric wire 11 from the operation recipe information 172, and act to pull out that electric wire 11 by a predetermined length with the transfer robot 125, and cut that pulled out electric wire 11 with the electric wire cutting machine 13. This results in that electric wire 11 having the length designated according to the design value of the electric wire length.

The printing control section 163 is configured to print, with the two printers 18, identification marks to be attached to the two end portions respectively of each electric wire 11. In the present embodiment, the two printers 18 are arranged on both the end portions, respectively, of the work bench 15, so as to attach the identification marks to both the end portions, respectively, of each electric wire 11 (see FIG. 1). Further, in the present embodiment, the two printers 18 are used to print ring marks 181 as the identification marks, respectively, and mark tapes 182 with two-dimensional codes (QR codes (registered trademark)) 182a, respectively, attached thereto configured to be able to identify each electric wire 11. Note that the two code readers 19 and the two continuity checking testers 20 are also being provided so as to be able to perform the operation at both the ends, respectively, of each electric wire 11 (in FIG. 2, only one of the two code readers 19 and only one of the two continuity checking testers 20 are shown).

Figure 5:
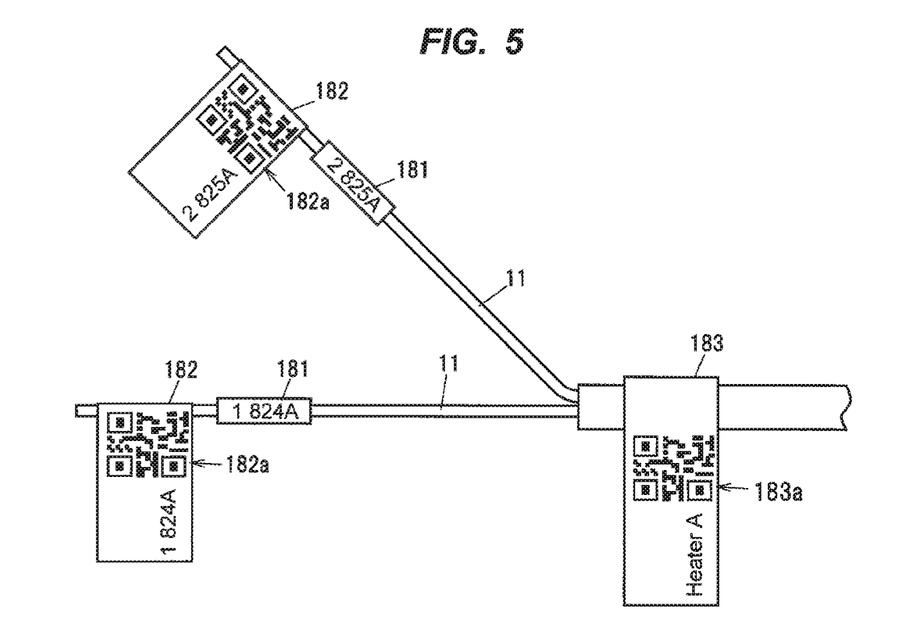
FIG. 5 is a diagram showing end portions of electric wires each being fitted with a respective ring mark and a respective mark tape thereon.

As shown in FIG. 5, the ring marks 181 and the mark tapes 182 printed by the two printers 18 are configured to be attached to both the end portions, respectively, of each electric wire 11. In the present embodiment, the mark tapes 182 are configured in such a manner that the two-dimensional codes 182a are printed on the mark tapes 182 respectively, but may be configured in such a manner that the bar codes are printed on the mark tapes 182 respectively. In addition, a vicinity of a branching portion of the electric wires 11 is fitted with an area label tape 183 which is configured to indicate an area (an area label (Area label) in the operation recipe information 172) of a connection destination of the electric wires 11 extended out from that branching portion. As with the mark tapes 182, the area label tape 183 is configured in such a manner that a two-dimensional code 183a configured to be able to specify the area of the area label connection destination is being printed on the area label tape 183. The mark tapes 182 and the area label tapes 183 are adhesive seals with the two-dimensional codes 182a and 183a respectively being printed thereon, and they are attached to each of the electric wires 11 in such a manner that their respective one parts are wrapped around each of the electric wires 11.

The ring marks 181 are a ring-shaped member, and are attached to each of the end portions of the electric wires 11 by inserting each of the end portions of the electric wires 11 into an inner periphery of each of the ring marks 181 respectively. In the present embodiment, the inner diameters of the ring marks 181 are formed larger than the outer diameters of the electric wires 11, and the ring marks 181 are movably fitted on each of the end portions of the electric wires 11 in a longitudinal direction of each of the electric wires 11 respectively. Since the mark tapes 182 are located closer to the end portions of the electric wires 11 than the ring marks 181, the ring marks 181 movable in the longitudinal directions of the electric wires 11 are prevented from slipping off the end portions of the electric wires 11 respectively.

Note that, in the present embodiment, the ring marks 181 and the mark tapes 182 are used as the identification marks, but that the ring marks 181 may be omitted while only the mark tapes 182 may be used as the identification marks. Further, it is naturally possible to use an IC tag, an RFID tag, or the like as the identification marks. Further, the information to be printed on the mark tapes 182, the ring marks 181, and the area label tapes 183 may be printed on an outer periphery of each of the electric wires 11 (on an outer periphery of the outer sheath of each of the electric wires 11).

The continuity checking section 164 is configured to check the continuity of each of the electric wires 11 after laying out of each of the electric wires 11. The continuity checking section 164 is configured to perform the continuity checking by bringing the probes of the two continuity checking testers 20 into contact with the conductor of each of the electric wires 11 at both the end portions of each of the electric wires 11 to obtain the conductor resistance of each of the electric wires 11, and judge as to whether the conductor resistance of each of the electric wires 11 is within a predetermined normal range. In the present embodiment, the continuity checking section 164 is configured to display an indication of the continuity checking on the display device 14 by means of the displaying control section 161 after the laying out of each of the electric wires 11, and to erase the display of the indication of the continuity checking after continuity checking of each of the electric wires 11. Details of this point will be described later.

(Configuration to Display the Progress Status)

The wire harness production supporting device 10 according to the present embodiment is configured to include an identification code presenting means 2, which is configured to present an identification code of one of the plurality of electric wires 11 to be laid out, a reading in means 3, which is configured to read in the identification code of the one of the plurality of electric wires 11 to be laid out, a time recording section 4, which is configured to store in the storing section 17 a time at which the identification code of the one of the plurality of electric wires 11 to be laid out has been read in by the reading in means 3, and a progress status administrating section 5, which is configured to obtain a progress status of the production of the wire harness based on the time, at which the identification code of the one of the plurality of electric wires 11 to be laid out has been read in, having been stored in the storing section 17.

In the present embodiment, the identification code presenting means 2 is composed of the pop-up bar code displaying section 161a as a code displaying section to in turn display the identification codes (herein, the bar codes) on the display device 14 in accordance with a wire laying out order of the plurality of electric wires 11 to be laid out. The reading in means 3 is composed of the two code readers 19 which are configured to be able to read in the bar codes displayed on the display device 14.

In addition, the wire harness production supporting device 10 is configured to include a correspondence decision section 6 that is configured to judge as to whether the code information on the identification marks (the two-dimensional codes 182a of the mark tapes 182) read in by the two code readers 19, and the code information on the identification codes (the bar codes 142) displayed on the display device 14 are in correspondence with each other, respectively. In the present embodiment, the code information on the two-dimensional codes 182a of the mark tapes 182 and the code information on the bar codes 142 displayed on the display device 14 are configured to match each other, and the correspondence decision section 6 is configured to judge as to whether the code information on the two-dimensional codes 182a of the mark tapes 182 read in by the two code readers 19, and the code information on the bar codes 142 displayed on the display device 14 are matching each other.

Further, the correspondence decision section 6 is configured in such a manner that, as a result of the decision made by the correspondence decision section 6, if the code information on the two-dimensional codes 182a of the mark tapes 182 read in by the two code readers 19, and the code information on the bar codes 142 displayed on the display device 14 are not matching each other, then the correspondence decision section 6 displays alert information on the display device 14 by means of the displaying control section 161. Note that the correspondence decision section 6 may be configured in such a manner that, for example when the code information on the two-dimensional codes 182a of the mark tapes 182 read in by the two code readers 19, and the code information on the bar codes 142 displayed on the display device 14 are not matching each other, the correspondence decision section 6 activates an alarm device configured to generate an alarm with sound or light or the like, and provided adjacent to the work bench 15.

The time recording section 4 is being equipped with a built-in clock function, and is configured to, each time one of the plurality of electric wires 11 is laid out, store a time at which the one of the plurality of electric wires 11 has been laid out, in the storing section 17. In the present embodiment, the time recording section 4 is configured to store a time at which the identification codes (the bar codes 142) have been read in by the two code readers 19, in the storing section 17. In the present embodiment, the time recording section 4 is configured in such a manner that, as a result of the decision made by the correspondence decision section 6, when the correspondence decision section 6 has determined that the code information on the two-dimensional codes 182a of the mark tapes 182 read in by the two code readers 19, and the code information on the bar codes 142 displayed on the display device 14 are matching each other, the time recording section 4 stores a time at which the bar codes 142 have been read in, in the storing section 17 as progress status administration information 173.

Note that the time at which the identification codes have been read in is not limited to the foregoing, but that the time at which the correspondence decision section 6 has determined that the code information on the two-dimensional codes 182a of the mark tapes 182 read in by the two code readers 19, and the code information on the bar codes 142 displayed on the display device 14 are matching each other may be stored as the time at which the identification codes have been read in. That is, the "time at which the identification codes have been read in" may not be strictly the time at which the identification codes have been read in, but the time at which the predetermined decision processing or the like resulting from the identification codes having been read in (in the present embodiment, the processing which determines that the code information on the two-dimensional codes 182a of the mark tapes 182 read in by the two code readers 19, and the code information on the bar codes 142 displayed on the display device 14 are matching each other) has ended, may be stored as the "time at which the identification codes have been read in". Note that the detailed timings at which the time recording section 4 records the times, and the like will be described in detail later with reference to the flow charts of FIGS. 7 to 10.

The progress status administrating section 5 is configured to obtain a progress status of the production of the wire harness based on a time having been stored in the storing section 17, in other words, progress status administration information 173, and displays the obtained progress status on the administrating display device 16a. In the present embodiment, a monitor attached to a personal computer being used as the control device 16 is being used as the administrating display device 16a, but a monitor provided separately from the control device 16, e.g., a large-screen monitor provided in a factory or the like, may be used as the administrating display device 16a.

More specifically, the progress status administrating section 5 is configured to, based on the progress status administration information 173, obtain the number of the laid out electric wires 11, the number of the unlaid out electric wires 11, the proportion of the laid out electric wires 11 to the total number of the electric wires 11 to be laid out, a preset standard operating time (target operating time), an elapsed time from the start of the operation, and the like, and display them on the administrating display device 16a as a progress status display screen.

Figure 6:
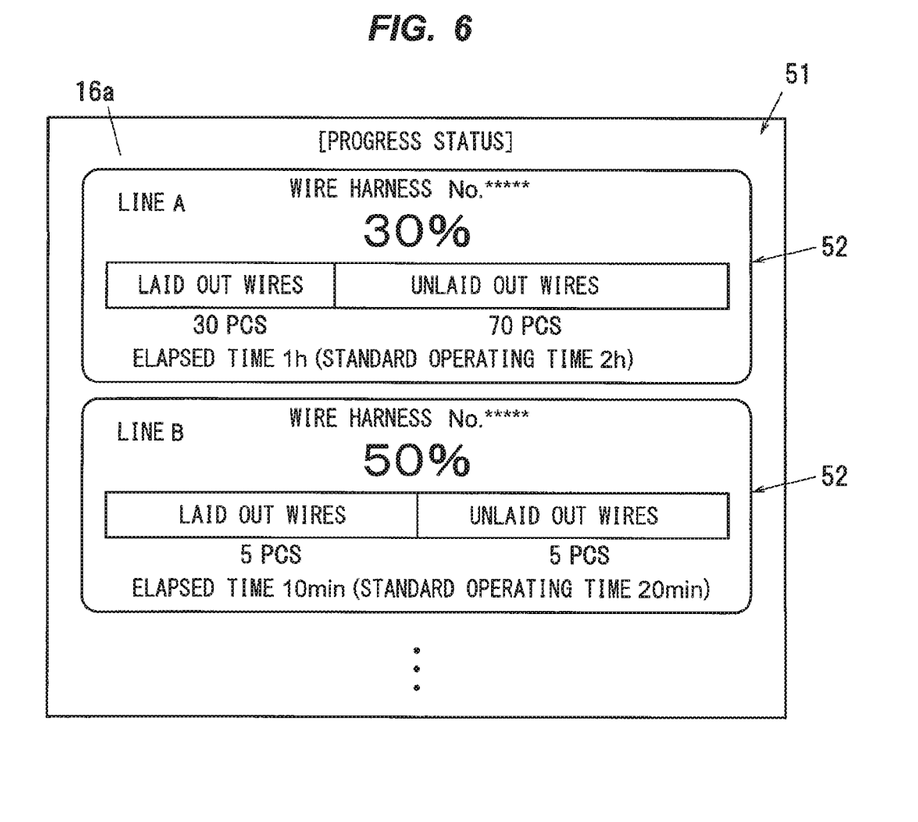
FIG. 6 is a diagram showing one example of a progress status display screen.

FIG. 6 shows one example of the progress status display screen. As shown in FIG. 6, the progress status display screen 51 is configured in such a manner as to display, for example, the progress status for each production line in a factory. Herein, as one example, a case where respective individual progress status displaying sections 52 of the two production lines A and B are displayed is being shown, but the number of the production lines to be displayed is not limited to the above number. Also, as the display form of each of the individual progress status displaying sections 52, various display forms can be adopted, for example by using a bar graph or a pie chart or the like to display the progress status. The display contents of each of the individual progress status displaying sections 52 are also not limited to those shown in FIG. 6, but can appropriately be configured, for example by displaying the proportion of the elapsed time to the standard operating time (target operating time), or the like.

(Control Flow in Control Device 16)

FIGS. 7 to 10 are flow charts showing control flows in the control device 16. The control device 16 executes the control flows of FIGS. 7 to 10 for each production line respectively of the factory.

Figure 7:
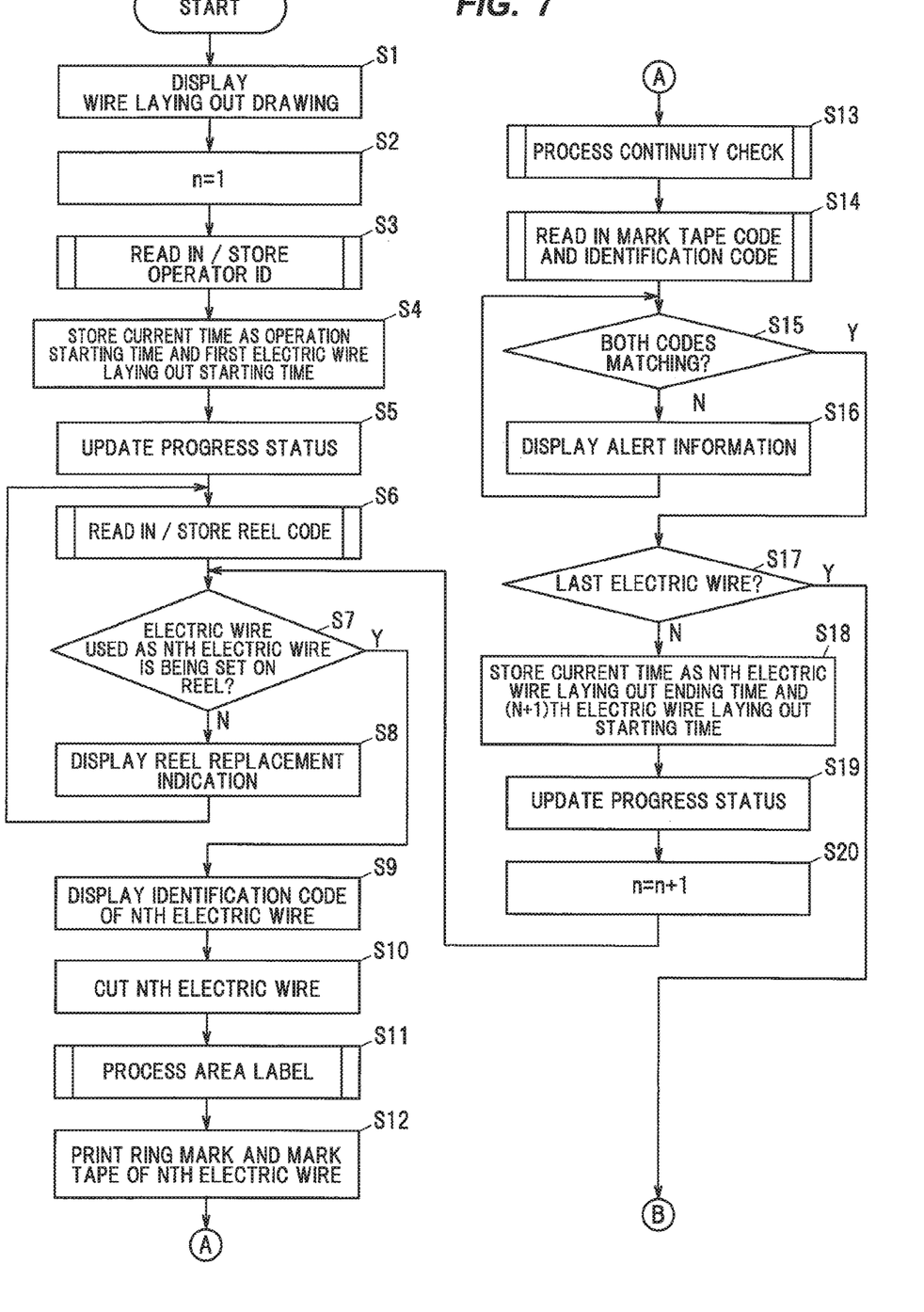
FIG. 7 is a flow chart showing a control flow with the control device.

As shown in FIG. 7, first, in step S1, the displaying control section 161 displays the wire laying out drawing 141 on the display device 14 based on the wire laying out image data 171 stored in the storing section 17. After that, in step S2, an initial value 1 is substituted for a variable n, and in step S3, an operator ID reading in/storing processing is performed. The operator ID refers to a code assigned to each operator to specify the operator, and is displayed as a bar code on a name tag or the like, for example. In the operator ID reading in/storing processing, the reading in processing of an operator ID (bar code) with the code reader 19 is performed, and the read in operator ID information is stored in the storing section 17. Note that, in the operator ID reading in/storing processing in step S3, the displaying control section 161 may be configured in such a manner as to display an indication of reading in the operator ID on the display device 14.

Hereinafter, the nth electric wire 11 to be laid out is referred to as the nth electric wire 11. After the operator ID has been read in step S3, in step S4, the time recording section 4 sets a current time as an operation starting time and a wire laying out starting time of the first electric wire, and stores it in the storing section 17 as the progress status administration information 173. After that, in step S5, the progress status administrating section 5 updates the progress status information of the progress status display screen 51.

After that, in step S6, a reel 121 code reading in/storing processing is performed. In the reel 121 code reading in/storing processing, the reading in processing of the electric wire identification code 121a with the code reader 19 is performed, and the read in electric wire identification code 121a information is stored in the storing section 17. Note that, in the reel 121 code reading in/storing processing in step S6, the displaying control section 161 may be configured in such a manner as to display an indication of reading in the electric wire identification code 121a on the display device 14.

After that, in step S7, the electric wire cutting control section 162 judges as to whether the electric wire to be used as the nth electric wire 11 is being set on the reel 121. That is, the electric wire cutting control section 162 judges as to whether the type of the electric wire 11 included in the information on the electric wire identification code 121a of the reel 121 is matching the type of the nth electric wire 11 in the operation recipe information 172. If a No decision is made in step S7, then, in step S8, the electric wire cutting control section 162 displays a reel replacement indication on the display device 14 by means of the displaying control section 161, and subsequently the flow returns to step S6.

If a Yes decision is made in step S7, then, in step S9, the displaying control section 161 displays the identification codes (the bar codes 142) of the nth electric wire 11 on the display device 14. The identification codes (the bar codes 142) are displayed at both the ends of the nth electric wire 11. After that, in step S10, the electric wire cutting control section 162 controls the electric wire feeding device 12 and the electric wire cutting machine 13 to cut the nth electric wire 11 to an electric wire length set in the operation recipe information 172. Note that the cutting of the electric wire 11 in step S10 may be executed by using the reading in of the bar codes 142 with the two code readers 19 as a trigger. The operator arranges the electric wire 11 cut in step S10 by using the wire laying out image data 171 displayed on the display device 14 and the identification codes (the bar codes 142) as markers.

Figure 9:
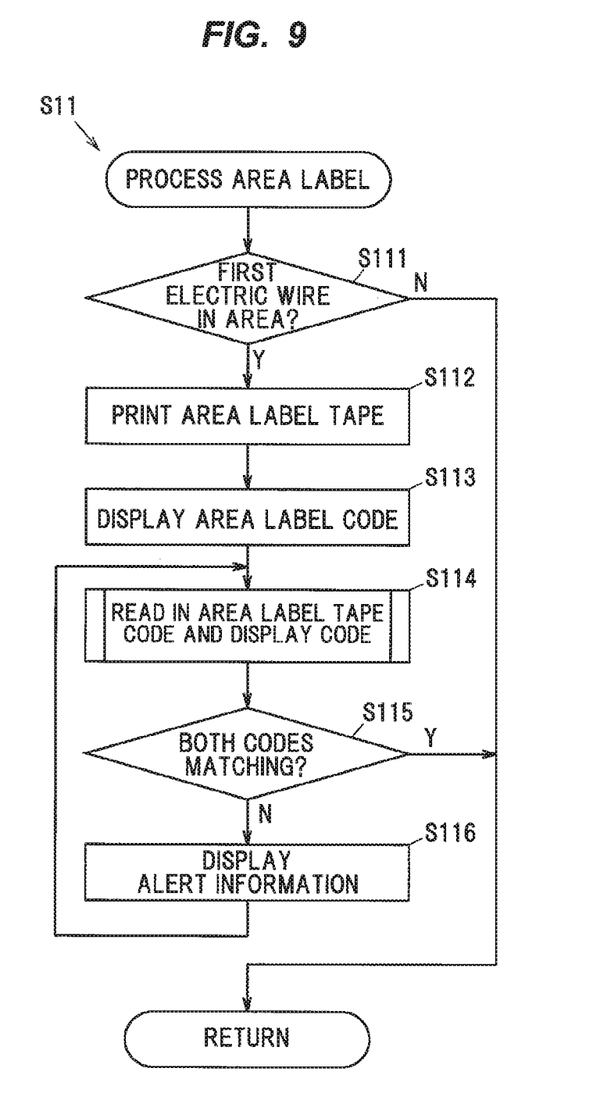
FIG. 9 is a flow chart showing an area label processing of FIG. 7.

After that, in step S11, an area label processing is performed. As shown in FIG. 9, in the area label processing of step S11, first, in step S111, the printing control section 163 looks up the operation recipe information 172 (the information on the area label (Area label)), and judges as to whether the nth electric wire 11 is the electric wire 11 to be first laid out in that area. If a No decision is made in step S111, then the flow returns as it is and progresses to step S12 in FIG. 7.

If a Yes decision is made in step S111, then, in step S112, the printing control section 163 prints the area label tapes 183 with the two printers 18. After that, in step S113, the displaying control section 161 displays codes (bar codes or two-dimensional codes) associated with the area labels on the display device 14, and in step S114, performs the reading in processing of the two-dimensional codes 183a of the area label tapes 183 and the bar codes 142 displayed on the display device 14. The operator affixes the area label tapes 183 printed by the two printers 18 to predetermined places on the electric wire 11 (places adjacent to the branching portions of the electric wire 11) arranged on the display device 14, and reads in the two-dimensional codes 183a of the area label tapes 183, and the bar codes 142 displayed on the display device 14, with the two code readers 19. Note that the locations on the electric wire 11 to which the area label tapes 183 are affixed may be displayed on the display device 14. For example, the locations on the electric wire 11 to which the area label tapes 183 are affixed may be displayed on the display device 14 by displaying codes in correspondence with the area labels also at positions (or vicinities thereof) in correspondence with the locations on the electric wire 11 to which the area label tapes 183 are affixed. Further, the locations on the electric wire 11 to which the area label tapes 183 are affixed may be displayed with a color, or a frame, or the like.

After that, in step S115, the correspondence decision section 6 judges as to whether the two types of the codes having been read in step S114, that is, the two-dimensional codes 183a of the area label tapes 183 and the bar codes 142 displayed on the display device 14 are matching each other (or are in correspondence with each other). If a No decision is made in step S115, then, in step S116, the correspondence decision section 6 displays alert information (e.g., a message such as "area labels do not match" or the like) on the display device 14 by means of the displaying control section 161, and the flow returns to step S114. If a Yes decision is made in step S115, then the flow returns and progresses to step S12 in FIG. 7.

Returning to FIG. 7, in step S12, the printing control section 163 looks up the operation recipe information 172, and prints the ring marks 181 and the mark tapes 182 of the nth electric wire 11. The operator attaches the ring marks 181 and the mark tapes 182 printed by the two printers 18 to the end portions of the electric wire 11 arranged on the display device 14. After that, in step S13, a continuity checking processing is performed.

Figure 10:
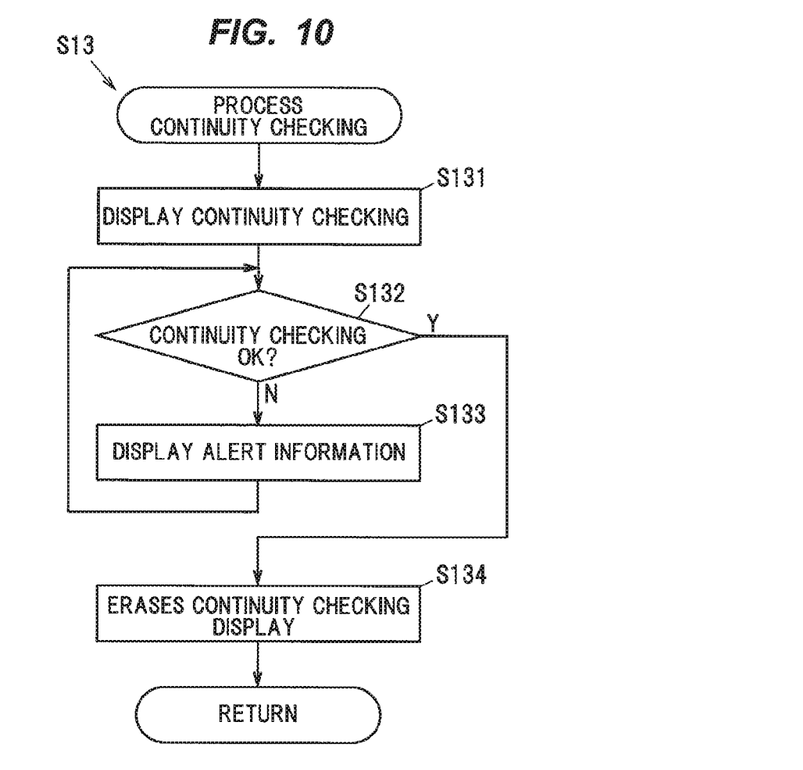
FIG. 10 is a flow chart showing a continuity checking processing of FIG. 7.
Figure 11:
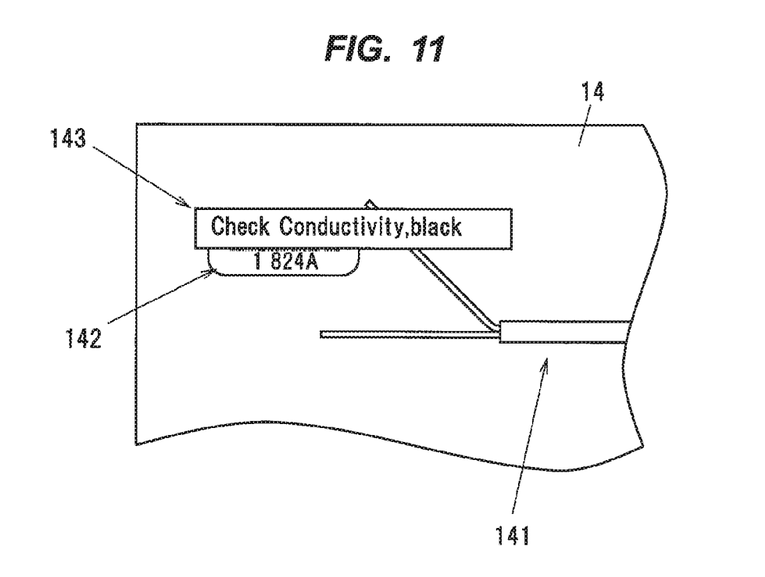
FIG. 11 is a diagram showing a display example of an indication of continuity checking.

As shown in FIG. 10, in the continuity checking processing in step S13, first, in step S131, the continuity checking section 164 displays an indication of continuity checking on the display device 14 by means of the displaying control section 161. As shown in FIG. 11, the continuity check display 143 is displayed in such a manner as to be partially superimposed on the bar code 142, so the location of the bar code 142 can be identified by the operator, but the bar code 142 cannot be read by the operator. This makes it possible to prevent the bar code 142 from being read before the continuity checking and proceeding to the next step. Further, since a part of the bar code 142 can be visually recognized by the operator, it is possible to smoothly perform the reading of the bar code 142 after the continuity checking. In the present embodiment, a display such as a "Check Conductivity, black" is performed as the continuity check display 143, so that it is possible to suppress the occurrence of incorrect continuity checking by presenting the color of the electric wire 11 (the color of the outer sheath of the electric wire 11, herein, black) to be subjected to the continuity checking.

Returning to FIG. 10, after displaying the indication of the continuity checking in step S131, in step S132, the continuity checking section 164 performs the continuity checking of the nth electric wire 11 based on an output of the two continuity checking testers 20. Specifically, the continuity checking section 164 computes the resistance value of the nth electric wire 11 based on the output of the two continuity checking testers 20, and when the computed resistance value falls within a predetermined normal value range, the continuity checking section 164 determines the continuity of the nth electric wire 11 as accepted.

If a No decision is made in step S132, then, in step S133, the continuity checking section 164 displays alert information on the display device 14 by means of the displaying control section 161, and the flow returns to step S132. Note that, if rejection (No) is repeated a predetermined number of times in step S132, then the flow may be configured in such a manner as to return to step S7 in FIG. 7 to perform the laying out of the nth electric wire 11 again. In this case, the electric wire 11 having been rejected in the continuity checking is discarded. If a Yes decision is made in step S132, that is, if the continuity has been accepted, then, in step S134, the continuity checking section 164 erases the continuity check display 143 from the display device 14 by means of the displaying control section 161, and the flow returns (progresses to step S14 in FIG. 7).

Returning to FIG. 7, in step S14, the reading in processing of the two-dimensional codes 182a of the mark tapes 182 and the identification codes (the bar codes 142) is performed. The operator reads in the two-dimensional codes 182a of the mark tapes 182 attached to the end portions of the electric wire 11 and the identification codes (the bar codes 142) displayed on the display device 14 with the two code readers 19.

After that, in step S15, the correspondence decision section 6 judges as to whether the two types of the codes having been read in step S14, that is, the two-dimensional codes 182a of the mark tapes 182 and the identification codes (the bar codes 142) are matching each other (or are in correspondence with each other). If a No decision is made in step S15, then, in step S16, the correspondence decision section 6 displays the alert information (e.g., a message such as "electric wire identification codes do not match" or the like) on the display device 14 by means of the displaying control section 161, and the flow returns to step S15.

If a Yes decision is made in step S15, then, in step S17, the time recording section 4 looks up the operation recipe information 172 and judges as to whether or not the nth electric wire 11 is the last electric wire 11 to be laid out. If a No decision is made in step S17, then, in step S18, the time recording section 4 sets a current time as an nth electric wire laying out ending time and an (n+1)-th electric wire laying out starting time, and stores it in the storing section 17 as the progress status administration information 173. After that, in step S19, the progress status administrating section 5 updates the progress status information of the progress status display screen 51. After that, after the variable n is incremented in step S20, the flow returns to step S7 and the wire laying out operation of the next electric wire 11 is started.

Figure 8:
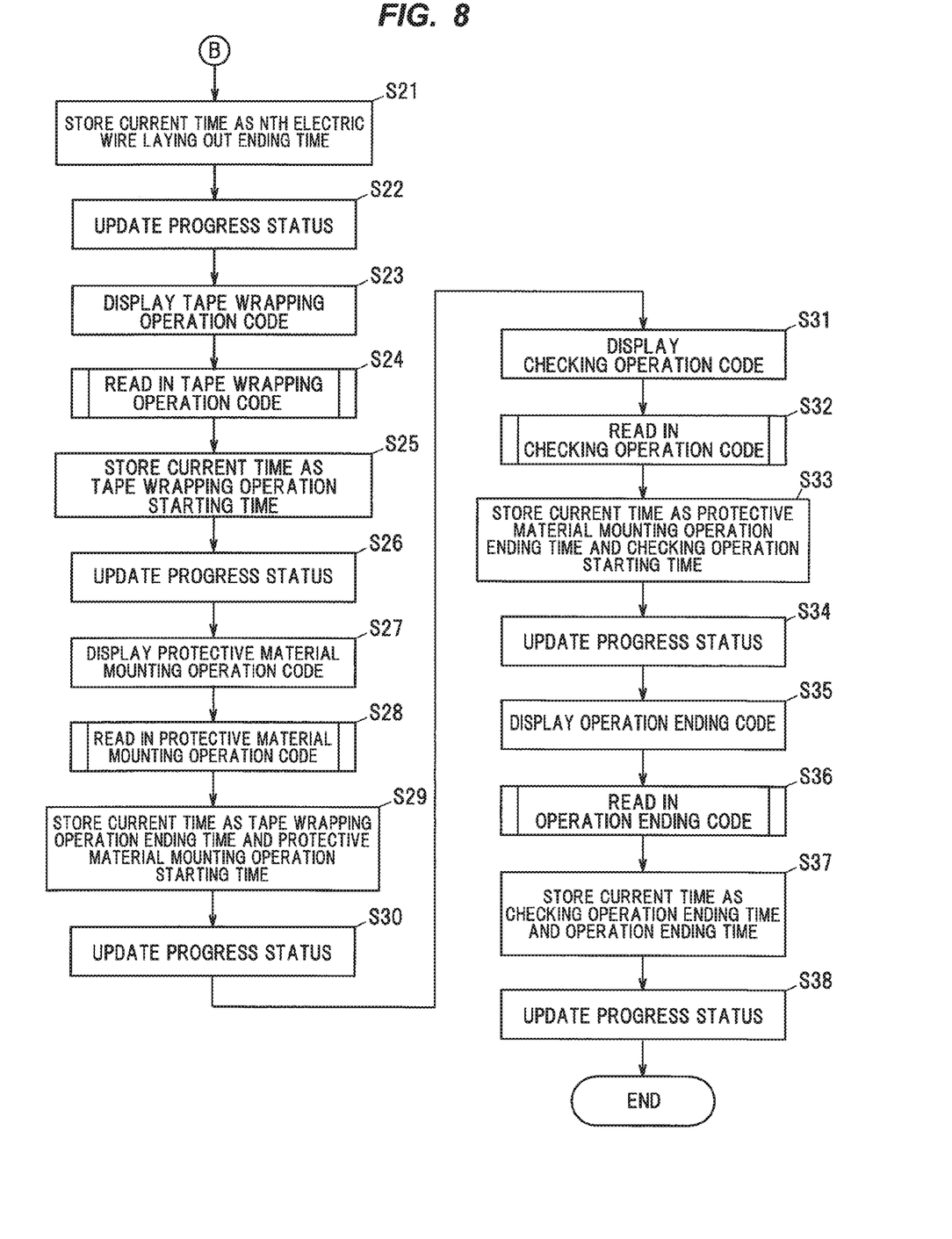
FIG. 8 is a flow chart showing the control flow with the control device.

If a Yes decision is made in step S17, then the flow progresses to step S21 in FIG. 8. In step S21, the time recording section 4 sets a current time as an nth electric wire laying out ending time, and stores it in the storing section 17 as the progress status administration information 173. After that, in step S22, the progress status administrating section 5 updates the progress status information of the progress status display screen 51. Note that the timing of the updating of the progress status information displayed on the progress status display screen 51 may be a predetermined time interval.

After that, in step S23, the displaying control section 161 displays tape wrapping operation codes on the display device 14. At this point of time, positions where the tape is wrapped are displayed on the display device 14. The positions where the tape is wrapped are displayed with, e.g., a color or a frame or the like. After that, in step S24, a tape wrapping operation code reading in processing is performed. The operator bundles the plurality of electric wires 11 and wraps them with the tape based on the display on the display device 14, and thereafter reads in the tape wrapping operation codes with the two code readers 19. After the tape wrapping operation codes have been read in step S24, in step S25 the time recording section 4 sets a current time as a tape wrapping operation starting time, and stores it in the storing section 17 as the progress status administration information 173. After that, in step S26, the progress status administrating section 5 updates the progress status information of the progress status display screen 51.

After that, in step S27, the displaying control section 161 displays protective material mounting operation codes on the display device 14. At this point of time, the positions where the protective material is mounted are displayed on the display device 14. The positions where the protective material is mounted are displayed with, e.g., a color or a frame or the like. After that, in step S28, a protection material mounting operation code reading in processing is performed. The operator mounts the electric wires 11 with the protection material based on the display on the display device 14 and thereafter reads in the protection material mounting operation codes with the two code readers 19. After the protection material mounting operation codes have been read in step S28, in step S29 the time recording section 4 sets a current time as a tape wrapping operation ending time and a protection material mounting operation starting time, and stores it in the storing section 17 as the progress status administration information 173. After that, in step S30, the progress status administrating section 5 updates the progress status information of the progress status display screen 51.

After that, in step S31, the displaying control section 161 displays checking operation codes on the display device 14. After that, in step S32, a checking operation code reading in processing is performed. After performing a predetermined checking, the operator reads in the checking operation codes with the two code readers 19. After the checking operation codes have been read in step S32, in step S33 the time recording section 4 sets a current time as a protection material mounting operation ending time and a checking operation starting time, and stores it in the storing section 17 as the progress status administration information 173. After that, in step S34, the progress status administrating section 5 updates the progress status information of the progress status display screen 51.

After that, in step S35, the displaying control section 161 displays operation ending codes on the display device 14. After that, in step S36, an operation ending code reading in processing is performed. After the operation ending codes have been read in step S36, in step S37 the time recording section 4 sets a current time as a checking operation ending time and an operation ending time, and stores it in the storing section 17 as the progress status administration information 173. After that, in step S38, the progress status administrating section 5 updates the progress status information of the progress status display screen 51. After that, the processing is ended.

Actions and Advantageous Effects of the Embodiment

As described above, the wire harness production supporting device 10 according to the present embodiment is configured to include the identification code presentation section 2 configured to present the identification codes (the bar codes 142) of each of the electric wires 11 to be laid out, the reading in means 3 configured to read in the identification codes (the bar codes 142), the time recording section 4 configured to store the time at which the identification codes (the bar codes 142) have been read in by the reading in means 3 in the storing section 17, and the progress status administrating section 5 configured to obtain the progress status of the production of the wire harness based on the time, at which the identification codes (the bar codes 142) have been read in by the reading in means 3, having been stored in the storing section 17.

As a result, since each of the electric wires 11 to be laid out is laid out while being collated, it is possible to suppress the occurrence of an incorrect operation. Also, by recording the time at which the identification codes (the bar codes 142) have been read in, it is possible to keep track of the operation history during the laying out of each of the electric wires 11, and it is therefore possible to easily check the progress status of the operation. Further, by storing the time at which the identification codes (the bar codes 142) have been read in, the administrator can know the time taken to perform each operation, which contributes to the optimization or efficiency improvement of the production process.

Note that although it is also conceivable to obtain the operation history or the operation times by, for example pressing a button when the operations are completed, in this case, there is concern that the operator may accidentally press the button during the operations, which is lacking in reliability. In order to prevent such an incorrect operation, it can be said that it is more desirable to configure the reading in means 3 by a method of optically reading in the identification codes (the bar codes 142).

Modifications

Although in the above embodiment, the progress status of the production of the wire harness is being obtained based on the time at which the identification codes (the bar codes 142) have been read in, the progress status of the production of the wire harness can also be obtained based on the time at which the continuity checking processing has been completed. In this case, the time recording section 4 is configured in such a manner as to store, in the storing section 17, the time at which the continuity checking of each of the electric wires 11 with the continuity checking section 164 has been completed. In the control flow, steps S14 to S16 in FIG. 7 described above may be omitted, and the time at which the continuity checking processing of step S13 has been completed may be stored in step S18 as the nth electric wire laying out ending time and the (n+1)-th electric wire laying out starting time. In this case, by omitting the collation of the electric wires 11 to be laid out, it is possible to ensure the reduction of the operating time, and it is therefore possible to enhance the operating efficiency.

Summary of the Embodiments

Next, the technical ideas grasped from the above-described embodiments will be described with the aid of the reference characters and the like in the embodiments. It should be noted, however, that one of the reference characters and the like in the following descriptions is not to be construed as limiting the constituent elements in the claims to the members and the like specifically shown in the embodiments.

[1] A wire harness production supporting device (10), which is configured to produce a wire harness by in turn laying out a plurality of electric wires (11) on a wire laying out drawing (141), comprising: a time recording section (4) configured to, each time one of the plurality of electric wires (11) is laid out, store a time at which the one of the plurality of electric wires (11) has been laid out, in a storing section (17); and a progress status administrating section (5) configured to obtain a progress status of the production of the wire harness based on the time at which the one of the plurality of electric wires (11) has been laid out having been stored in the storing section (17).

[2] The wire harness production supporting device (10) as defined in [1] above, further comprising: an identification code presenting means (2) configured to present an identification code (142) of the one of the plurality of electric wires (11) to be laid out, and a reading in means (3) configured to read in the identification code (142) of the one of the plurality of electric wires (11) to be laid out, wherein the time recording section (4) is configured to store in the storing section (17) a time at which the identification code (142) of the one of the plurality of electric wires (11) to be laid out has been read in by the reading in means (3).

[3] The wire harness production supporting device (10) as defined in [2] above, further comprising a display device (14) configured to display the wire laying out drawing (141), wherein the identification code presenting means (2) is configured to include a code displaying section (161*a*) that is configured to in turn display the respective identification codes (142) of the plurality of electric wires (11) to be laid out on the display device (14) in accordance with a wire laying out order of the plurality of electric wires (11) to be laid out.

[4] The wire harness production supporting device (10) as defined in [3] above, wherein the respective identification codes (142) of the plurality of electric wires (11) to be laid out are bar codes or two-dimensional codes, and the reading in means (3) is a code reader (19), that is configured to be able to read in the bar codes or the two-dimensional codes.

[5] The wire harness production supporting device (10) as defined in any one of [2] to [4] above, wherein each of the plurality of electric wires (11) to be laid out is fitted with a respective identification mark (182) thereon, and the wire harness production supporting device (10) further comprises a correspondence decision section (6), that is configured to judge as to whether the respective identification mark (182) and the respective identification code (142) of each of the plurality of electric wires (11) to be laid out having been read in by the reading in means (3) are in correspondence with each other.

[6] The wire harness production supporting device (10) as defined in any one of [1] to [5] above, further comprising an administrating display device (16*a*), that is configured to display a progress status, wherein the progress status administrating section (5) is configured to display a progress status display screen (51) including a proportion of a number of the electric wires (11) laid out to a total number of the electric wires (11) to be laid out, on the administrating display device (16a).

[7] The wire harness production supporting device (10) as defined in [1] above, further comprising a continuity checking section (164) that is configured to perform a continuity checking processing on the one of the plurality of electric wires (11) to be laid out, wherein the time recording section (4) is configured to store, in the storing section (17), a time at which the continuity checking processing of the one of the plurality of electric wires (11) to be laid out with the continuity checking section (164) has been completed.

[8] A wire harness production supporting method, which is configured to produce a wire harness by in turn laying out a plurality of electric wires (11) on a wire laying out drawing (141), comprising: each time one of the plurality of electric wires (11) is laid out, storing a time at which the one of the plurality of electric wires (11) has been laid out, in a storing section (17); and obtaining a progress status of the production of the wire harness based on the time at which the one of the plurality of electric wires (11) has been laid out having been stored in the storing section (17).

Although the embodiments of the present invention have been described above, the above described embodiments are not to be construed as limiting the inventions according to the claims. Further, it should be noted that not all the combinations of the features described in the embodiments are indispensable to the means for solving the problem of the invention.

The present invention can appropriately be modified and implemented without departing from the spirit thereof. For example, although, in the above embodiments, the wire laying out image is being displayed on the display device 14, the present invention is not limited to this, but a wire laying out drawing printed on a paper sheet may be used. In this case, as the identification code presenting means 2, for example, the identification code presenting means configured in such a manner as to in turn display the identification codes on a monitor may be used, or it is also possible to use identification codes (such as bar codes or the like) printed in tabular form on the above wire laying out drawing or a paper sheet different from the above wire laying out drawing, as the identification code presenting means 2.

Further, although, in the above embodiments, for each operation of the tape wrapping operation, the protective material mounting operation, and the checking operation, the two bar codes 142 are read in before each operation thereof, and the time at which the two bar codes 142 have been read in is used as the starting time of the corresponding operation, the present invention is not limited to this, but the two bar codes 142 may be read in after each operation thereof, and the time at which the two bar codes 142 have been read in may be used as the ending time of the corresponding operation.

Further, although, in the above embodiments, the progress status information is updated each time each operation such as the laying out of each of the plurality of electric wires 11 is completed, the updating timing of the progress status information is not limited to this, but for example, the progress status administrating section 5 may update the progress status information by looking up the progress status administration information 173 at predetermined time intervals. Alternatively, for example, the progress status administrating section 5 may be configured in such a manner as to count up a variable representing the number of the operations completed each time each operation is completed in the control flow, and thereby obtain the progress status information from the above variable and the overall number of the operations.

In addition, as well as the standard operating time for the production of the entire wire harness, the progress status display screen 51 may display a standard operating time for the operation being currently performed. In this case, the respective standard operating times for each operation may be set individually based on a history of an operating time of each operation, and the like, or may be set by simply dividing the standard operating time for the production of the entire wire harness by the number of the operations.

Furthermore, although not mentioned in the above embodiments, the control device 16 may be mounted with a standard operating time correcting section, that is configured to automatically correct the standard operating time based on a history of a time taken to produce the wire harness (a time from the start of the operation to the end portion of the operation).

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A wire harness production supporting device, which is configured to produce a wire harness by in turn laying out a plurality of electric wires on a wire laying out drawing on a plurality of display devices, comprising:
   a time recording memory section configured to, each time one of the plurality of electric wires is laid out, store a time at which the one of the plurality of electric wires has been laid out, in a storing section;
   a progress status administrating and displaying control section configured to obtain a progress status of the production of the wire harness based on the time at which the one of the plurality of electric wires has been laid out having been stored in the storing section;
   an identification code presenter configured to present on the display, an identification code of the one of the plurality of electric wires to be laid out;
   an identification code reading-in reader configured to read-in the identification code of the one of the plurality of electric wires to be laid out, each of the plurality of electric wires to be laid out being fitted with a respective identification mark hereon;
   a continuity checking section that is configured to perform a continuity checking processing on the plurality of electric wires to be laid out after the identification code reading-in reader reads the identification code, wherein the time recording section is configured to store, in the storing section, a time at which the continuity checking processing of the one of the plurality of electric wires to be laid out with the continuity checking section has been completed; and
   a correspondence decision control section that is configured to judge as to whether the respective identification mark and the respective identification code of each of the plurality of electric wires to be laid out having been read-in by the identification code reading-in reader are in correspondence with each other,
   wherein, when the correspondence decision control section judges the respective identification mark corresponds to the respective identification code, the time recording section is configured to store, in the storing section, a time at which the identification mark has been read or a time at which a of the correspondence has been made.

2. The wire harness production supporting device according to claim 1, further comprising:
the display device configured to display the wire laying out drawing, wherein the identification code presenter is configured to include a code displaying section that is configured to in turn display the respective identification codes of the plurality of electric wires to be laid out on the display device in accordance with a wire laying out order of the plurality of electric wires to be laid out.

3. The wire harness production supporting device according to claim 2, wherein the respective identification codes of the plurality of electric wires to be laid out comprise bar codes or two-dimensional codes, and the identification code reading-in reader comprises a code reader, that is configured to be able to read in the bar codes or the two-dimensional codes.

4. The wire harness production supporting device according to claim 1, further comprising:
an administrating display device, that is configured to display a progress status, wherein the progress status administrating and displaying section is configured to display a progress status display screen including a proportion of a number of the electric wires laid out to a total number of the electric wires to be laid out, on the administrating display device.

5. A wire harness production supporting method, which is configured to produce a wire harness by in turn laying out a plurality of electric wires on a wire laying out drawing on a plurality of display devices, comprising:
each time one of the plurality of electric wires is laid out, storing a time at which the one of the plurality of electric wires has been laid out, in a storing section;
obtaining a progress status of the production of the wire harness based on the time at which the one of the plurality of electric wires has been laid out having been stored in the storing section;
presenting on the display section, an identification code of the one of the plurality of electric wires to be laid out;
reading-in the identification code of the one of the plurality of electric wires to be laid out, each of the plurality of electric wires to be laid out being fitted with a respective identification mark thereon;
performing by a continuity checking section, a continuity checking processing on the plurality of electric wires to be laid out after an identification code reading-in reader reads the identification code;
judging as to whether the respective identification mark and the respective identification code of each of the plurality of electric wires to be laid out having been read-in are in correspondence with each other; and
when a correspondence decision control section judges the respective identification mark corresponds to the respective identification code, storing a time at which the identification mark has been read or a time at which a judging of the correspondence has been made.

6. A wire harness production supporting device, which is configured to produce a wire harness by in turn laying out a plurality of electric wires on a wire laying out drawing on a plurality of display devices, comprising:
a processor; and
a memory section on which storing instructions to cause the processor to execute:
each time one of the plurality of electric wires is laid out, storing a time at which the one of the plurality of electric wires has been laid out, in a storing memory section;
obtaining a progress status of the production of the wire harness based on the time at which the one of the plurality of electric wires has been laid out having been stored in the storing memory section;
presenting on the display section an identification code of the one of the plurality of electric wires to be laid out;
reading-in the identification code of the one of the plurality of electric wires to be laid out, each of the plurality of electric wires to be laid out being fitted with a respective identification mark thereon;
performing, by a continuity checking section, a continuity checking processing on the plurality of electric wires to be laid out after an identification code reading-in reader reads the identification code;
judging as to whether the respective identification mark and the respective identification code of each of the plurality of electric wires to be laid out having been read-in are in correspondence with each other; and
when a correspondence decision control section judges the respective identification mark corresponds to the respective identification code, storing a time at which the identification mark has been read or a time at which a judging of the correspondence has been made.

7. The wire harness production supporting device according to claim 6, the memory section further storing instructions to cause the processor to perform:
displaying the wire laying out drawing, and
displaying the respective identification codes of the plurality of electric wires to be laid out in accordance with a wire laying out order of the plurality of electric wires to be laid out.

8. The device for supporting wire harness production according to claim 6, wherein the respective identification codes of the plurality of electric wires to be laid out comprise bar codes or two-dimensional codes, and
the memory section further storing instructions to cause the processor to perform: reading the bar codes or the two-dimensional codes.

9. The device for supporting wire harness production according to claim 6, the memory section further storing instructions to cause the processor to perform:
displaying a progress status, including a proportion of a number of the electric wires laid out to a total number of the electric wires to be laid out.

10. The device for supporting wire harness production according to claim 6, the memory section further storing instructions to cause the processor to perform:
continuity checking processing on the one of the plurality of electric wires to be laid out; and
storing a time at which the continuity checking processing of the one of the plurality of electric wires to be laid out has been completed.

* * * * *